United States Patent [19]

Kinase et al.

[11] 3,971,220

[45] July 27, 1976

[54] OIL FENCE

[75] Inventors: Takeo Kinase; Isamu Yano; Kanichi Okubo; Hidetoshi Kitakoga; Hiromitsu Tayama, all of Sagamihara, Japan

[73] Assignee: Mitsubishi Denki Kabushiki Kaisha, Japan

[22] Filed: Feb. 15, 1974

[21] Appl. No.: 443,131

[30] Foreign Application Priority Data

Feb. 23, 1973 Japan.......................... 48-23420[U]
Aug. 30, 1973 Japan.......................... 48-101721[U]
Dec. 12, 1973 Japan.......................... 48-144152[U]

[52] U.S. Cl................................................. 61/1 F
[51] Int. Cl.² ......................................... E02B 15/04
[58] Field of Search................... 61/1 F, 5; 210/242, 210/DIG. 21

[56] References Cited
UNITED STATES PATENTS

| | | | |
|---|---|---|---|
| 3,731,491 | 5/1973 | Markel et al. .......................... | 61/1 F |
| 3,764,015 | 10/1973 | Rolfson ............................... | 210/242 |
| 3,766,738 | 10/1973 | Gauch ................................. | 61/1 F |
| 3,775,982 | 12/1973 | Lamboley ............................. | 61/1 F |
| 3,786,637 | 1/1974 | Muramatsu et al. .................... | 61/1 F |
| 3,792,589 | 2/1974 | Sayles................................. | 61/1 F |
| 3,807,177 | 4/1974 | Oberg.................................. | 61/1 F |

*Primary Examiner*—Robert L. Wolfe
*Assistant Examiner*—David H. Corbin
*Attorney, Agent, or Firm*—Robert E. Burns; Emmanuel J. Lobato; Bruce L. Adams

[57] ABSTRACT

An array of semicylindrical floats juxtaposed on one surface of a longitudinally elongated screen about each of spaced cross strips on the screen opposes a similar array disposed on the other surface of the screen and a chain-shaped sinker is disposed along one longitudinal edge of the screen. Also a floating framework is disclosed having one side partly cut away and roll means disposed in front of the cut-away portion. The roll means can be driven to sinuously house the oil fence within the framework and to pay it out from the latter. Alternatively, a takeup shaft disposed in a box-shaped member with buoyant chambers and fenders may be driven to coil and uncoil the oil fence on and from it through one open side of the box-shaped member.

3 Claims, 19 Drawing Figures

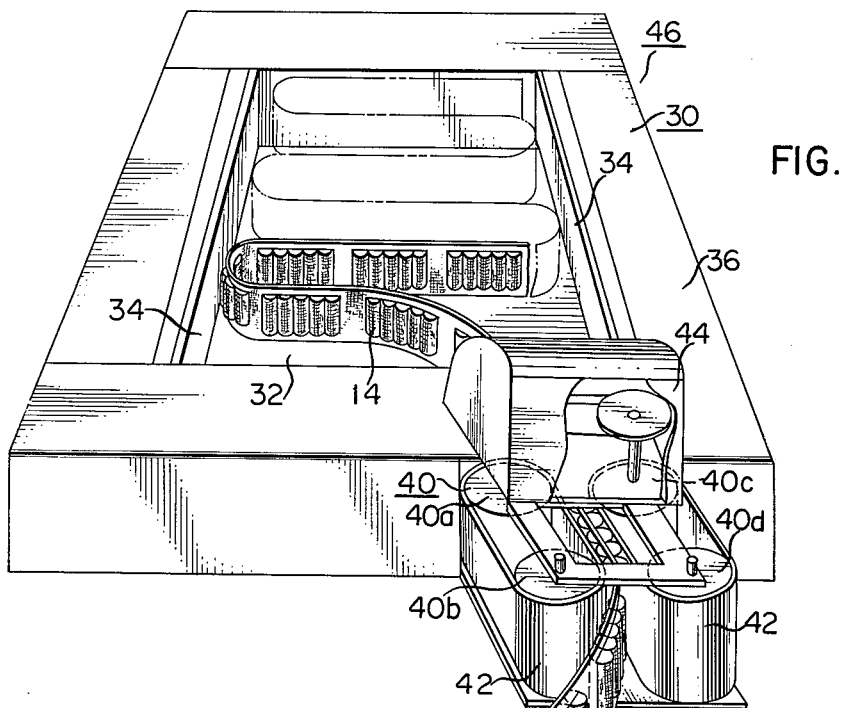
FIG. 6
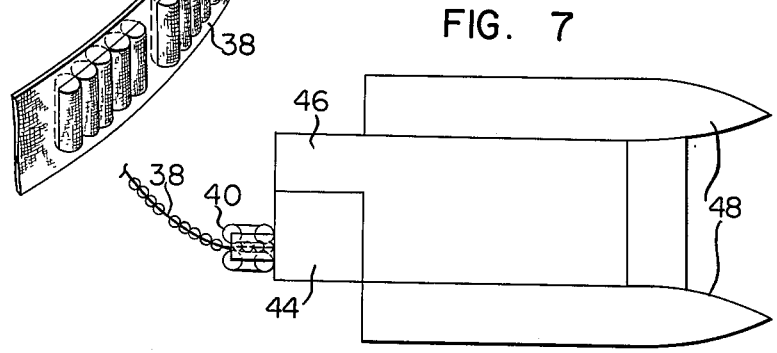
FIG. 7
FIG. 8
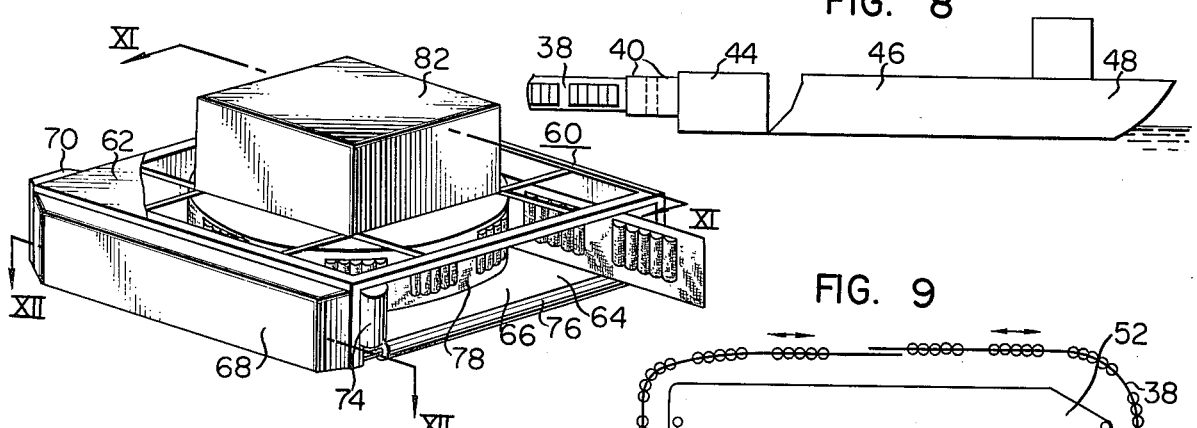
FIG. 10
FIG. 9
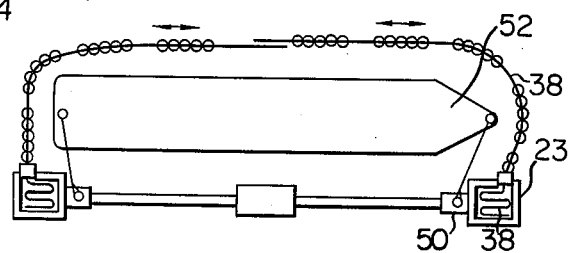

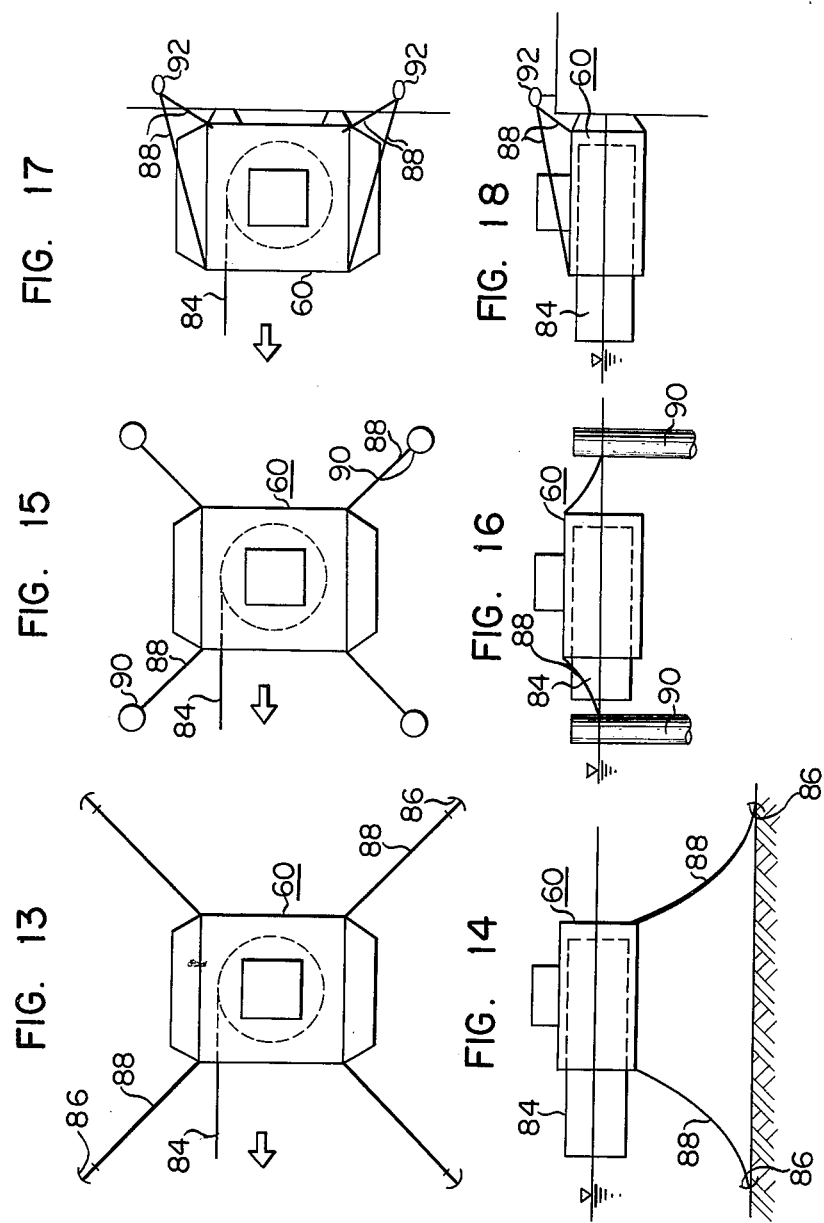

OIL FENCE

BACKGROUND OF THE INVENTION

This invention relates to an oil fence and an apparatus for taking up the same.

Oil fences have been recently put to practical use to collect and restore oil spilled on the sea and in harbors during the navigation of ships and upon failures thereof in order to minimize public nuisances resulting from the spilling of the oil. Conventional oil fences have comprised the shielding screen member, a plurality of reinforcing strips disposed in spaced parallel relationship on the screen member and widthwise thereof, one float secured to each of the reinforcing strips, one sinker attached to one end of each strip and a length of reinforcing rope extending throughout the length of the screen member to cross the reinforcing strips. Such a construction of oil fences has not only occupied a large space required to be housed during non-service because of the presence of the bulk floats but also lacked the rapidity in spreading the oil fences. This has resulted from the fact that there is no choice but to fold sinuously the fences for housing. In addition, it has been extremely difficult to spread and withdraw oil fences because of considerable lengths thereof. It is very desirable to provide means for winding and unwinding oil fences into and from coils.

SUMMARY OF THE INVENTION

Accordingly it is an object of the present invention to provide a new and improved oil fence very easy in handling.

The present invention accomplishes this object by the provision of an oil fence comprising, in combination, a longitudinally elongated, shielding screen member of flexible material, a plurality of rigid reinforcing strips disposed at predetermined equal intervals on the screen member to traverse the latter thereof, one split float unit disposed on the screen member about each of the reinforcing strips, sinker means disposed at one of the longitudinal edges of the screen member throughout the length, and a length of reinforcing rope disposed on one surface of the screen member to extend longitudinally thereof.

It is another object of the present invention to provide a new and improved takeup apparatus for taking up the oil fence of the type as above described in the preceding paragraph for housing and spread it in simple manner with a high efficiency.

The present invention also accomplishes the latter object by the provision of a takeup apparatus for taking up an oil fence, comprising, in combination, a floating framework of square cross section, one side of the floating framework being partly cut away to form an opening for taking an oil fence of the type as above described in and out from the floating framework, and roll means disposed on the floating framework in front of the opening to drive the oil fence.

In order to coil and uncoil an oil fence of the type as above described, a box-shaped member may comprise a front side open to take the oil fence in and out from the same therethrough, buoyant chambers attached to bilateral sides thereof, fender means attached to the rear side, and a takeup shaft centrally disposed within the box-shaped member to takeup the oil fence thereon.

BRIEF DESCRIPTION OF THE DRAWINGS

The present invention will become more readily apparent from the following detailed description taken in conjunction with the accompanying drawings in which:

FIG. 6 is a perspective view of an apparatus for taking up an oil fence, constructed in accordance with the principles of the present invention;

FIG. 7 is a schematic plan view of a twin hull boat towing the takeup apparatus shown in FIG. 6;

FIG. 8 is a side elevational view of the twin hull boat shown in FIG. 7;

FIG. 9 is a diagrammatic plan view illustrating the manner in which a pair of takeup apparatus shown in FIG. 6 are in operation in a harbor while they are moored at dolphins;

FIG. 10 is a perspective view of another takeup apparatus constructed in accordance with the principles of the present invention, with parts broken away to illustrate the intertnal construction;

FIGS. 13 through 18 are diagrammatic views illustrating different manners in which the takeup apparatus shown in FIGS. 10, 11 and 12 is moored to stationary members wherein FIGS. 13, 15 and 17 are plan views and FIGS. 14, 16 and 18 are elevational views of FIGS. 13, 15 and 17 respectively.

DESCRIPTION OF THE PREFERRED EMBODIMENTS

Figure 1:
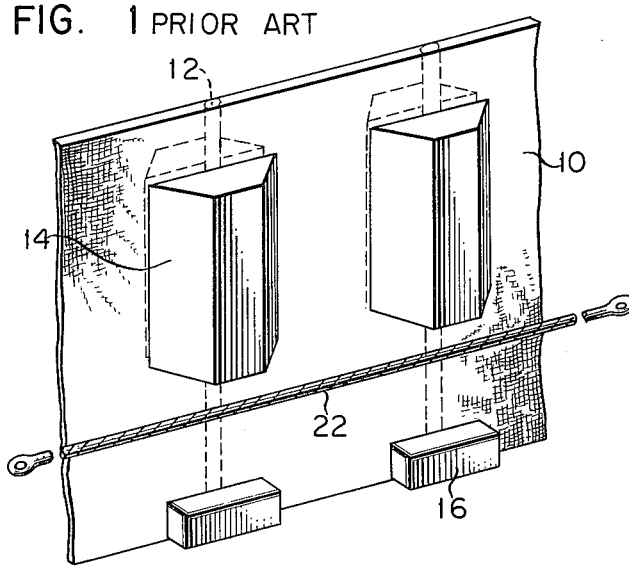
FIG. 1 is a fragmental perspective view of an oil fence constructed in accordance with the principles of the prior art.
Figure 3:
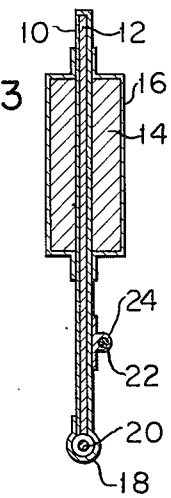
FIG. 3 is an enlarged cross sectional view as taken along the line III—III of FIG. 2.

Referring now to the drawings and FIG. 1 in particular, there is illustrated a conventional oil fence. The arrangement illustrated comprises a longitudinally elongated, shielding screen member 10, a plurality of reinforcing strips 12 disposed in spaced parallel relationship on the screen member 10 to traverse the latter, one pair of opposite floats 14 disposed on both surfaces of screen member 10 about each of the reinforcing strips 12, and one sinker 16 attached to one end of each strip 12 at one edge, in this case, a lower edge as viewed in FIG. 1 of one surface of the screen member 10. Then a length of reinforcing rope 22 is longitudinally disposed on the one surface of the screen member 10 between the floats and sinkers 14 and 16 respectively and has both eyed end portions projecting beyond both ends of the screen member 10.

It is generally required to fold up oil fences as small as possible in their unused position and also to be able to be rapidly spread into their operative position. Conventional oil fences such as shown in FIG. 1 have occupied large spaces required to be housed when not used. This is because the associated floats are bulky. Also the oil fences have lacked the rapidity in spreading the same for the reason that the only method of housing the oil fences is to fold them in a sinuous manner. Although there have been known oil fences having floats disposed thereon in parallel relationship with the longitudinal axis thereof, such oil fences have been more inconvenient to be housed. It is very desirable and has been long requested in the art to provide wound type oil fences in order to facilitate their housing and spreading.

On the other hand, oil fences are considerably long, for example, of from 300 to 5000 meters and therefore it has been extremely difficult to spread and withdraw the oil fences. For example, if an oil fence is to be spread on the sea from a ship or a shore then several persons have previously performed the paying-out operation because a suitable equipment therefor does not exist. This has been accompanied by both danger that at least some of the operators may be pulled down into the sea because the oil fence has a weight as heavy as from 5 to 15 kilograms per meter and a low efficiency with which the operation is performed. This is also true in the case of the operation of withdrawing the oil fences.

In order to meet the request for providing wound type oil fences as above described and also to eliminate the objections to the conventional oil fences just described, the applicants designed and constructed an apparatus for taking up oil fences on a drum after the repetition of methods of trial and error. The designed apparatus comprised a frame adapted to be attached to a quay or a ship's side, a shaft vertically fitted into a pair of bearings disposed at both end plates of the frame, a mechanism for applying a driving force to the head of the shaft, a drum slidably fitted onto the shaft to engage the shaft through a key, a float secured to the lower portion of the drum and a flange secured to the upper portion of the drum whereby an oil fence can be taken up on the drum. The results of experiments indicated the following deficiencies:

1. There was a fear that grains of sand and floating matters might enter the slidable portion between the shaft and the drum and eventually the sliding movement therebetween might be inhibited. This was because the slidable portion was immersed in the sea;

2. Since the slidable portion could not have a low coefficient of friction, it was difficult for the drum to follow the movement of waves; and 3. The shaft was required to be long enough to be adapted to the tide and a change in the surface of the sea caused from waves resulting in a large-sized construction. Also an increase in the length of the shaft caused an increase in the bending moment of the shaft leading to the necessity of increasing the diameter thereof.

The present invention contemplates to eliminate those deficiencies.

Figure 2:
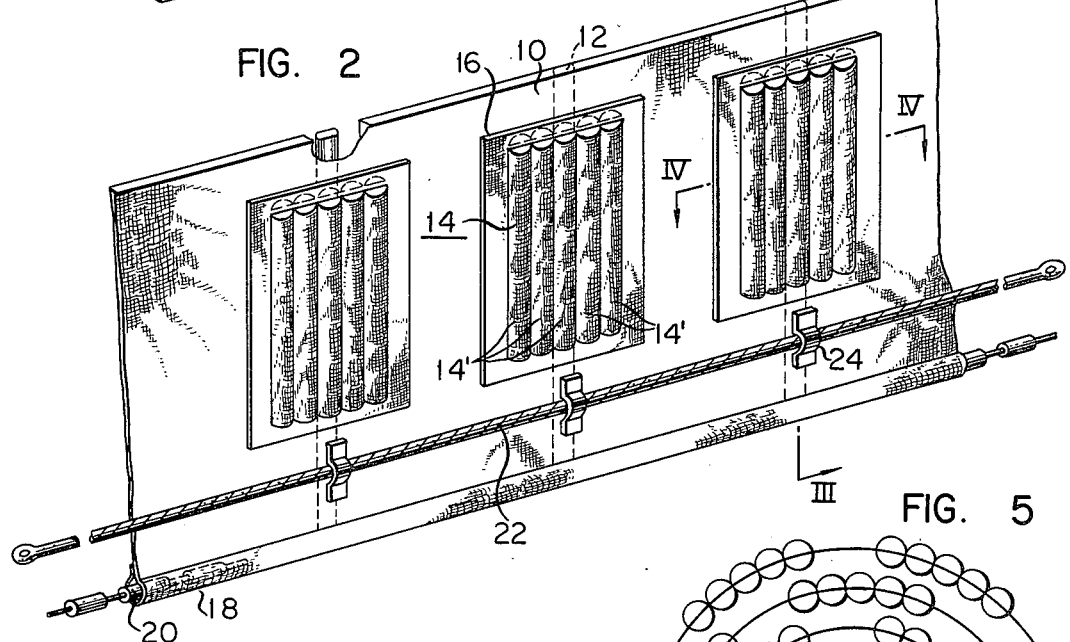
FIG. 2 is a fragmental perspective view of an oil fence constructed in accordance with the principles of the present invention.
Figure 4:
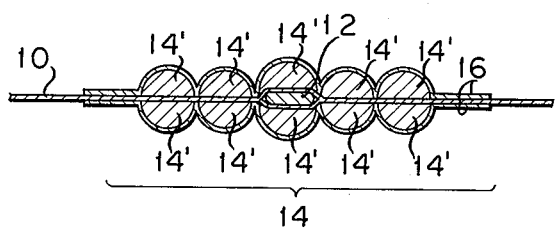
FIG. 4 is an enlarged sectional view of the float unit shown in FIG. 2 with the section taken along the line IV—IV of FIG. 2.

Referring now to FIG. 2, there is illustrated an oil fence constructed in accordance with the principles of the present invention. The arrangement illustrated comprises a shielding screen member 10 of any suitable flexible material such as a rubber coated cloth or synthetic-resin coated cloth, which is water impervious and a plurality of reinforcing strips 12 disposed at predetermined equal intervals on the screen member to traverse the latter. In FIG. 2 a part of the screen member 10 is shown as being spread. The reinforcing strips 12 are formed of any suitable rigid material and are coextensive with the width of the screen member 10. As best shown in FIG. 4, each of the reinforcing strips 12 is snugly fitted, for example, into one elongated pouch extending through the width of the screen member 10 at its position where the strip is to be disposed and complementary in shape to the same.

Then a plurality of float units in the form of rectangles forming the gist of the present invention and generally designated by the reference numeral 14 are disposed at predetermined equal intervals on the screen member 10 so as to equidistantly extend from the lengthwise axes of the respective reinforcing strips 12 on both sides and to be relatively biased toward one of the longitudinal edges, in this case, the upper edge as viewed in FIG. 2 of the screen member 10. More specifically, each of the float units 14 is of a split type and includes an array of elongated semicylindrical floats 14' disposed side by side and about the lengthwise axis of the associated strip 12 on each surface of the screen member 10 to form minute gaps therebetween. The flat surfaces of the individual semicylindrical floats 14' of the array on each surface of the screen member 10 oppose those of the array on the other surface thereof to sandwich the adjacent screen portions therebetween except for the central floats 14' of both arrays sandwiching the mating strip 12 therebetween through the screen portion encircling the latter (see FIG. 4). The floats 14' may be of any suitable foamed resin or a hollow semicylinder made of any suitable rigid material. A sheet-like member or covering 16 formed of a rubber coated cloth or a synthetic-resin coated cloth is applied to both the exposed surfaces of the individual floats 14' of each float unit 14 and the gaps therebetween and also to that portion of the screen member 10 adjacent to the periphery of the float unit 14 as by hot pressing.

The screen member 10 has the other or lower edge shaped into a loop 18 extending along the length thereof and a chain-shaped sinker 20 loosely extends through the loop 18. A reinforcing member comprised of a length of reinforcing rope 22 formed of a wire rope or a synthetic resin rope is disposed on the screen member 10 between the looped edge thereof and the adjacent sides of the float units 14 by having patches 24 fixing the same to the screen member 10 at preselected positions. The length of rope 22 has both eyed ends.

The float units and sinker 14 and 20 respectively are designed and arranged such that, with the oil fence spread out on the sea to be extended lengthwise, the oil fence vertically floats on the sea with the upper half thereof exposed above the sea while the lower half thereof sinks under the sea. Since the oil fence as above described has a predetermined fixed length, the required number thereof can be lengthwise interconnected by joints (not shown) and spread out on the sea thereby to encircle and collect heavy oil or the like run out on the sea.

Figure 5:
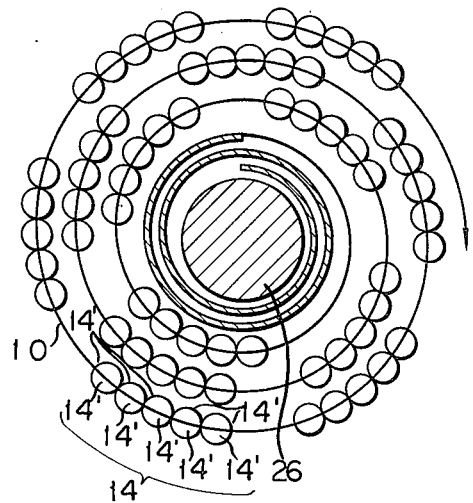
FIG. 5 is a plan view of the oil fence shown in FIGS. 2 through 4 and wound into a spiral coil for housing.

In each of the float units 14, a border between each pair of adjacent floats 14' has applied thereto the flexible cloth serving as a hinge. Therefore the float units can be bent about the borders widthwise of the screen member 10. This permits the oil fence to be spirally wound on a drum or a shaft 26 for housing (see FIG. 5).

As above described, the oil fence of the present invention includes the float units each divided into small individual floats. This results in several advantages. For example, the present invention provides oil fences easy in both manufacturing and setting up. Also those portions of the shielding screen member covered by the float units total a wide area resulting in a high resistance to a side wind. Further, the oil fence can readily be housed in place because it can be spirally wound on a drum or a shaft. In addition, the oil fence can be readily spread because it is required only to be unwound from the drum or shaft.

The present invention also contemplates to provide an apparatus for taking up an oil fence such as above described in conjunction with FIGS. 2 through 5.

Referring now to FIG. 6, there is shown an apparatus for taking up a flexible oil fence constructed in the principles of the present invention. The arrangement illustrated comprises floating framework generally designated by the reference numeral 30 and formed into a square cross section of hollow frame members or a bouyant material. The framework 30 includes a pool 32 defined by four inner lateral wall surfaces 34 and a closed bottom and having an open top defined by four upper wall surface 36. The inner lateral and upper wall surfaces 34 and 36 respectively may be suitably reinforced with sheet iron for the particular application.

As shown in FIG. 6, the framework 30 is provided on any one of the lateral walls, in this case, the lateral wall toward the viewer with an opening by partly cutting away that wall. A flexible oil fence 38 such as above described in conjunction with FIGS. 2 through 5 is permitted to be entered into and carried out from the pool 32 through the opening. Disposed in front of the opening, is roll means generally designated by the reference numeral 40 and including two pair of opposite rolls 40a, 40c and 40b, 40d disposed in tandem relationship and a pair of endless broad belts 42 spanned across the rolls 40a and 40b and across the rolls 40c and 40d. The spacing between the adjacent portions of the two belts 42 preferably has a distance sufficient to just sandwich the oil fence 38 therebetween in order to improve the system efficiency. The roller means 40 can be forwardly and reversely driven by an electric reversible motor (not shown) included in a driving device 44 disposed on that portion of the upper surface 36 adjacent the roll means 40.

In operation, the reversible motor in the driving device 44 can be driven in one direction with the roll means 40 biting one end of the oil fence 38 payed out externally of the arrangement of FIG. 6 generally designated by the reference numeral 46. Thereby the oil fence 38 is payed into the pool 32 through the roll means 40. In the pool 32, the oil fence is slowly folded in sinuous manner until it is bundled in that manner. On the contrary, if the oil fence 38 is desired to be payed out, the reversible motor is driven in the opposite direction to pull the oil fence out from the pool 32.

As shown in FIGS. 7 and 8, the arrangement 46 may be connected to a twin hull boat 48 to be moved to any desired place on the sea.

Alternatively, as shown in FIG. 9, the arrangement 46 or the housing apparatus may be moored to each of two dolphins 50 to pay the oil fences 38 out in the associated harbor to prevent escaped oil from further spreading and also to pay them into the apparatus 46 to prevent the spread oil fences 38 from interfering with the navigation of a ship 52.

From the foregoing it will be appreciated that the housing apparatus according to the present invention is advantageous in that the oil fence 38 can be payed out and in while the apparatus 46 is floating on the sea. This results in the safe and rapid operation. Further, the present apparatus can be moored at and moved to any desired position on the sea and also sufficiently house a long oil fence.

The present invention further contemplates to provide an apparatus for taking up a flexible oil fence having the following advantages:

1. The entire apparatus comes to the surface of the sea by means of a float; and
2. The apparatus is fixed to a quay, a dolphin or dolphins or an anchor or anchors through a length or lengths of rope, chain or the like.

As a result, the following effects has been exhibited:
1. The necessity of forming a slidable portion between the shaft and the takeup drum has been eliminated;
2. The shaft is sufficient to have a length somewhat greater than that of the takeup drum resulting in a decrease in the diameter of the shaft;
3. The apparatus can be towed to its destination with the oil fence maintained wound up on the drum; and
4. The apparatus has a good response to waves and can well follow a great change in the sea level.

Figure 11:
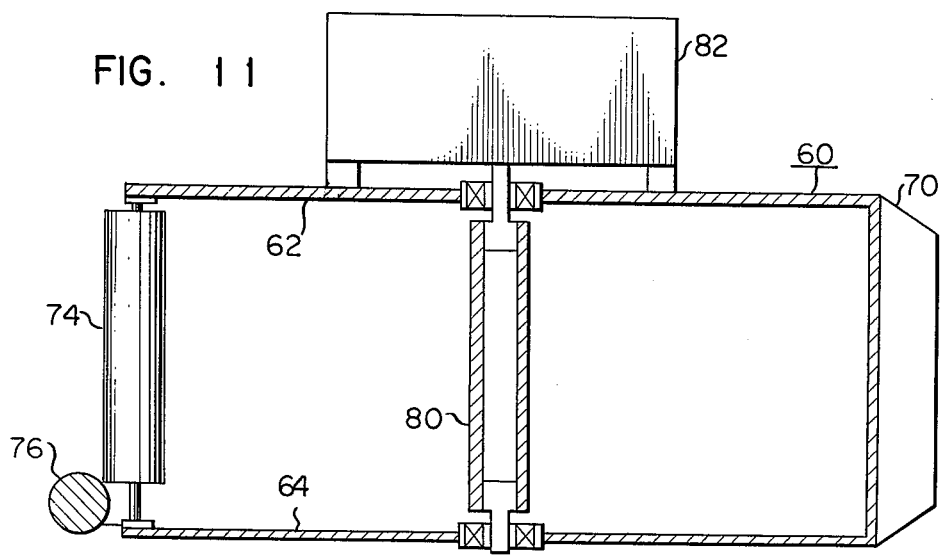
FIG. 11 is a vertical sectional view of the takeup apparatus shown in FIG. 10 with the section taken along the line XI—XI of FIG. 10.
Figure 12:
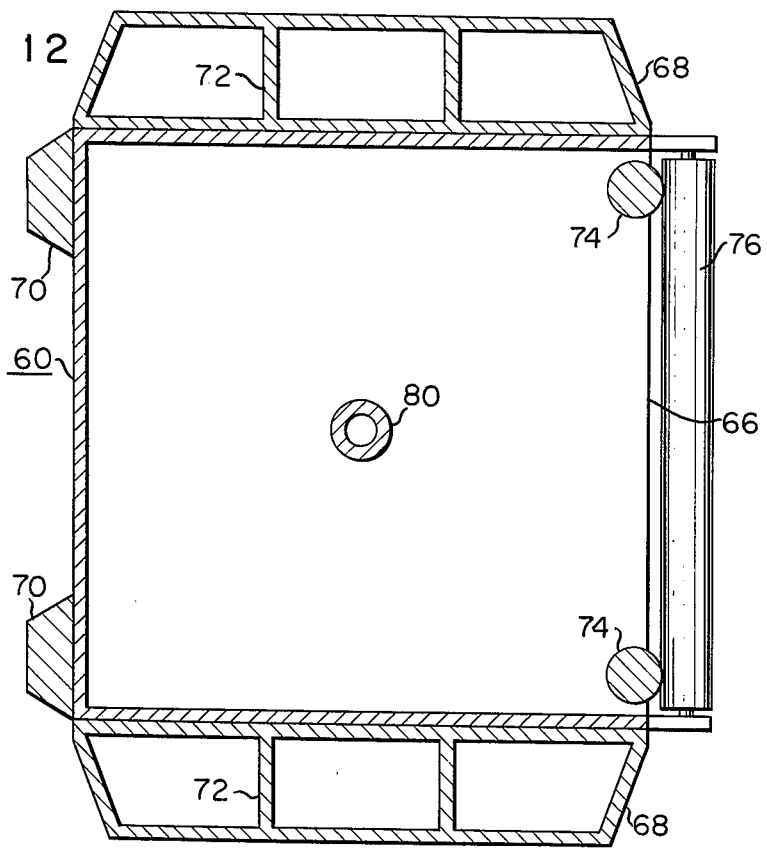
FIG. 12 is a horizontal sectional view of the takeup apparatus shown in FIG. 10 with the section taken along the line XII—XII of FIG. 10.

FIGS. 10 through 12 show a takeup apparatus exhibiting the effects just described. The arrangement illustrated comprises a square box-shaped member generally designated by the reference numeral 60 and including a top plate 62, a bottom plate 64, three side plates and an rectangular opening 66 formed on the remaining side or front side. As best shown in FIG. 12, the box-shaped member 60 has externally attached to the bilateral side plates a pair of buoyant chambers 68 symmetrical to each other and also externally attached to that side plate opposite to the opening 66 or the rear side a plurality, in this case, two of spaced fenders 68. The buoyant chambers 68 serve to cause the box-shaped member 60 to come to the surface of the sea and the fenders 70 serve to decrease a force with which the box-shaped member 80 may strike against the adjacent quay or ship by means of the action of waves. The buoyant chamber 68 can be divided into a plurality of compartments by partition 72 as shown in FIG. 12. This measure is effective for dispersifying risks due to damages to the buoyant chambers.

As best shown in FIG. 12, the opening 66 has a pair of vertical guide rollers 74 bilaterally disposed at both ends thereof and a horizontal guide roller 76 disposed on the lower side thereof across the vertical guide rollers 74. Those rollers 74 and 76 are effective for minimizing or substantially removing a friction occurring between the opening 66 and a flexible oil fence 78 as passed through the opening 66.

As shown in FIG. 11, a takeup shaft 80 is centrally disposed within the box-shaped member 60. That is, the takeup shaft 80 is rotatably supported at both ends to the top and bottom plates 62 and 64 respectively, through individual bearings.

Disposed upon the top plate 62 is a driving device 82 including, for example, an electric reversible motor (not shown) for driving the takeup shaft 80 through transmission means (not shown) well known in the art.

It is assumed that the oil fence 78 is the oil fence as above described in conjunction with FIGS. 2 through 5. It is also assumed that the oil fence 78 has one end portion fastened round the takeup shaft 80 by any suitable means. Oil fences have usually one end provided with a length of pull rope (not shown) so that such a length of pull rope has fastened round the shaft 80 as shown by a few turns of hatched been around the drum 26 in FIG. 5.

In operation, the reversible motor (not shown) included in the driving device 82 is driven in one direction to rotate the takeup shaft 80 in a corresponding direction of paying out the oil fence. This causes the oil fence 78 wound on the shaft 80 to be payed out over both at least one of the vertical guide rollers 74 and the horizontal guide roller 76. Then the oil fence 78 is spread on the sea while the upper half thereof is exposed above the surface of the sea and the lower half thereof is immersed in the sea.

In order to take up the spread oil fence 78 on the takeup shaft, the reversible motor (not shown) can be driven in the opposite direction. At that time, the oil fence 78 spread on the sea is vertically moved as the surface of the sea is vertically moved. Under these circumstances, the box-shaped member 60 is also vertically moved on the surface of the sea to the same extent as the oil fence 78 being taken up. Therefore the oil fence 78 can be taken up on the shaft 80 without hindrance.

The box-shaped member 60 can be moored in different manners. For example, the box-shaped member 60 floating on the surface of the sea 84 can be moored at four anchors 84 disposed at the bottom of sea at four corners of a square through respective mooring lines 84 connected between the anchors 82 and the adjacent corners of the box-shaped member 60 as shown in FIGS. 13 and 14. FIGS. 15 and 16 shows the box-shaped member 60 moored at stakes 88 in the similar manner as illustrated in FIGS. 13 and 14 and maintained floating on the surface of the sea 84. In FIGS. 17 and 18 the box-shaped member 60 is shown as being moored at a pair of dolphins 92 on a quay through two pairs of mooring lines 88 each pair connecting one dolphin 92 to the adjacent corners of the same on each side thereof and maintained floating on the surface of the sea 84. In FIGS. 13, 15 and 17, the arrow indicates a direction in which the floating oil fence 78 is spread on the sea.

Figure 19:
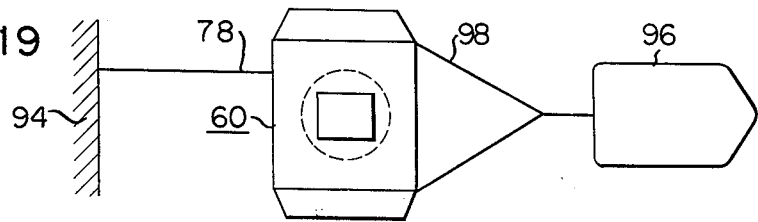
FIG. 19 is a diagrammatic view illustrating the manner in which a ship is towing the takeup apparatus shown in FIGS. 10, 13 and 14.

As shown in FIG. 19 the oil fence 78 having one end connected to a quay 94 can be spread on the sea while a ship travels to tow the box-shaped member 60 through two tow lines 98.

While the present invention has been illustrated and described in conjunction with a few preferred embodiments thereof it is to be understood that numerous changes and modifications may be restored to without departing from the spirit and scope of the present invention.

What we claim is:

1. An oil fence comprising, in combination:
   an elongated water impervious sheet-like flexible shielding screen having a pair of opposed longitudinal edges and a pair of opposed major surfaces;
   a plurality of rigid reinforcing strips disposed at intervals along the longitudinal dimension of said shielding screen and extending in a transverse dimension of said shielding screen;
   means for fixing said rigid reinforcing strips to said shielding screen;
   a plurality of pairs of opposed rigid elongated floats, each pair of opposed floats comprising a first float adjacent one of said opposed major surfaces and a second float adjacent the other of said opposed major surfaces and opposite said first float, each of said pairs of opposed floats being disposed along the longitudinal dimension of said shielding screen and extending in the transverse dimension thereof and spaced from other pairs of said opposed floats to permit flexing of the shielding screen at the spaces between pairs of said opposed floats, said pairs of opposed floats being disposed in groups about respective ones of said reinforcing strips and wherein the respective groups of floats are spaced apart along the longitudinal dimension of said shielding screen;
   means for fixing said pairs of opposed floats to said shielding screen comprising a plurality of sheet-like members each overlying a respective one of said groups of floats and each adhered to said shielding screen at the border of the respective one of said groups and at the spaces defined between adjacent ones of the pairs of said opposed floats comprising the respective one of said groups to maintain said groups of floats adjacent to said shielding screen;
   means disposed along a longitudinal edge portion of said shielding screen for weighting said edge portion to eliminate the buoyancy thereof;
   a rope-like reinforcing member disposed on a surface of said shielding screen and extending along a longitudinal dimension of said shielding screen; and
   means for fixing said reinforcing member to said shielding screen.

2. An oil fence according to claim 1, wherein said rigid elongated floats are semicylindrical.

3. An oil fence according to claim 1, wherein the floats comprising one pair of opposed floats within one of said groups overlie the one of said reinforcing strips about which said group is disposed.

* * * * *